UNITED STATES PATENT OFFICE.

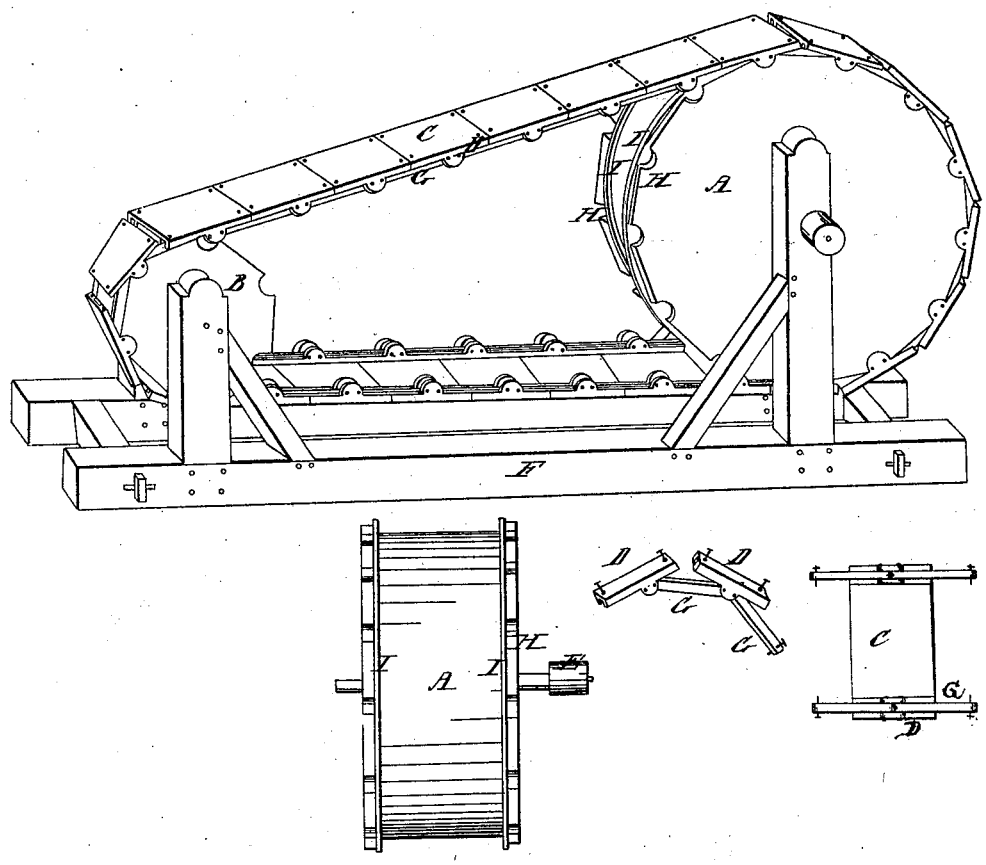

AARON PALMER, OF AKRON, NEW YORK.

ENDLESS-CHAIN HORSE-POWER FOR DRIVING MACHINERY.

Specification of Letters Patent No. 398, dated September 22, 1837.

*To all whom it may concern:*

Be it known that I, AARON PALMER, of Akron, in the county of Erie and State of New York, have invented a new and Improved Horse-Power; and I do hereby declare that the following is a full and exact description.

The nature of my invention consists in an iron and plank band so constructed as to bend but one way and capable of sustaining the weight of one or more horses without saging and wide enough for them to walk on for the purpose of propelling various kinds of machinery.

To enable others to make and use my invention I give the following description of its construction, and operation.

I make two bands eighteen feet and nine inches in circumference; composed of cast-iron joints. The joints are each nine inches long and consists of two parts. The outside part or cap is two inches wide and one inch thick (with a projection in the middle of one and a half inch more) with a groove on the inside one inch wide and within half an inch of the outside; as at D (see drawings). The inside part of the joint is a plain bar nine inches long two inches wide and one inch thick, as at G. This bar is placed in the groove of the caps (half its length in one cap; half in another) and united to them by half inch wrought bolts passing through the end of the bars and the projection of the cap. The two bands thus formed I place sixteen inches apart, parallel with each other and with the joints exactly opposite. I then place pieces of plank nine inches wide (as at C) across from one band to the other and fasten them to the caps with iron bolts thus forming of the whole one grand self sustaining band. This band I place on two sets of wheels one of which is three feet (as at A) the other eighteen inches (as at B) in diameter and so curved (as at H) as exactly to fit the band as it passes around them. These wheels are placed on shafts fixed in a solid frame (as at F) which (shafts) are six feet apart. The bottom of the wheels are on a level so that the top of the band when placed on them will form an inclined plane. On the shaft passing through the largest wheel is a whur (as at E) to receive a common band to convey the power to all kinds of machinery. On the iron and plank band I then place a horse and his weight propels the whole.

What I claim as my invention and desire to secure by Letters Patent is—

Constructing the band or chain of plank fastened to iron caps which caps are fastened to each other by plain iron bars bolted at each end to the center or projection of said caps so that the caps lap on the bars one half their length, thereby greatly increasing the strength of the joints—all as above described.

AARON PALMER.

Witnesses:
 W. R. BABCOCK,
 JAMES MONTGOMERY.